Nov. 24, 1931.  H. C. HARRISON  1,832,901
MEASUREMENT OF MECHANICAL IMPEDANCE
Filed Feb. 10, 1928
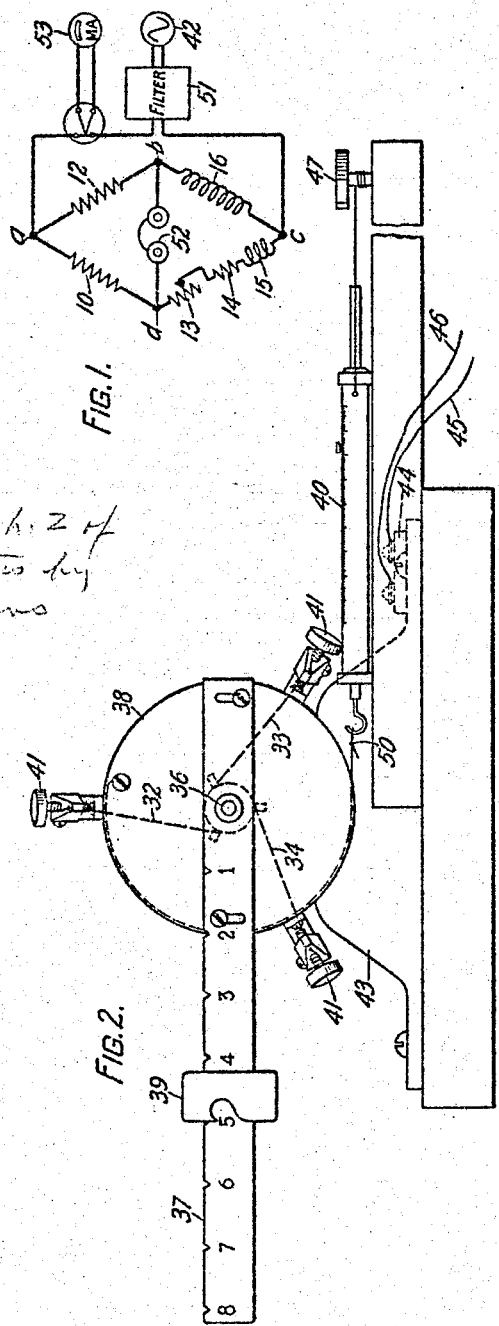
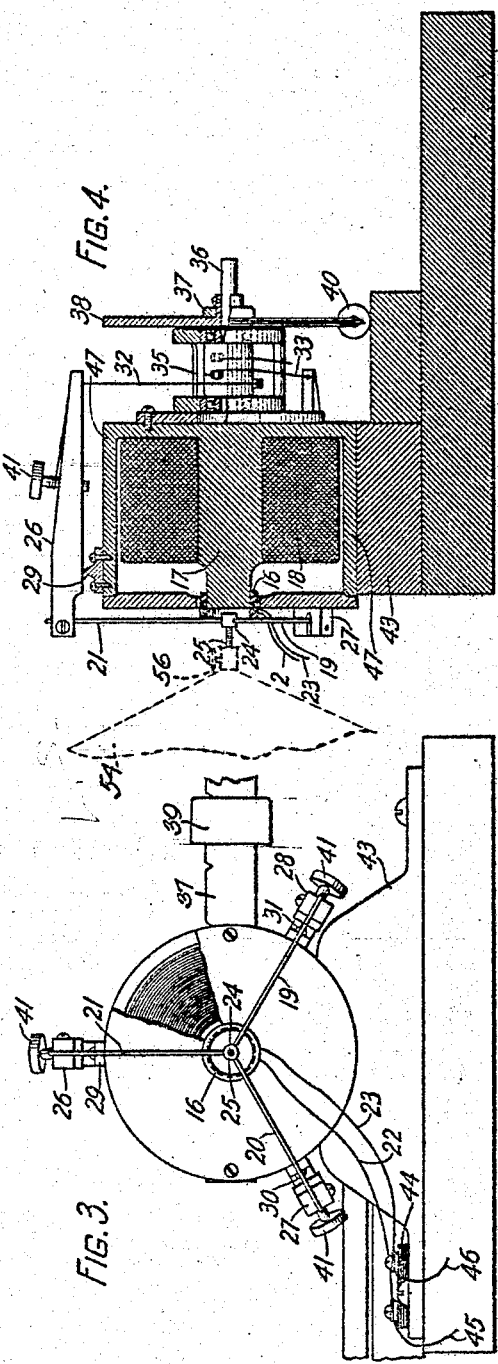
INVENTOR:
HENRY C. HARRISON
BY H.G. Banfield
ATTORNEY Patented Nov. 24, 1931

1,832,901

UNITED STATES PATENT OFFICE

HENRY C. HARRISON, OF PORT WASHINGTON, NEW YORK, ASSIGNOR TO BELL TELEPHONE LABORATORIES, INCORPORATED, OF NEW YORK, N. Y., A CORPORATION OF NEW YORK

MEASUREMENT OF MECHANICAL IMPEDANCE

Application filed February 10, 1928. Serial No. 253,246.

This invention relates to the measurement of mechanical impedance and more particularly to a device and method for measuring the mechanical impedance of a piece of apparatus at a predetermined frequency.

Prior to the present invention the mechanical impedance of a piece of apparatus was determined by means of complicated structures, the operation of which required a number of individual steps, and by the use of empirical formulæ. These methods were not satisfactory, however, due to the errors which were introduced in carrying the operation through from step-to-step.

In accordance with the present invention the mechanical impedance of a piece of apparatus may be measured directly and accurately by means of a hybrid bridge, partly electrical and partly mechanical, consisting of a variable resistance which is calibrated to read directly in mechanical ohms and a variable elasticity member for counter-acting the mechanical reactance of the piece of apparatus.

In accordance with a specified form of this invention the mechanical impedance of a piece of apparatus is measured by means of an electrical circuit of the Rayleigh bridge type two arms of which are simple fixed electrical resistances. In a third arm is an unknown electrical impedance comprising a coil mounted on a strip and supported in a steady magnetic field and in the fourth arm is a simulating coil in series with a variable electrical resistance. The simulating coil comprises a fixed electrical resistance and a fixed electrical inductance and is so proportioned that it counter-balances the motionless impedance of the moving coil. The moving coil is driven by means of alternating current of any desired frequency which is fed to opposite corners of the network.

The network is first balanced by varying the variable resistance in the fourth arm of the bridge and the tension in the strip supporting the coil in the magnetic field, a telephone receiver bridged across the network indicating by silence when a balance has been reached. A reading of the tension in the strip and a reading of the resistance is then recorded.

The piece of apparatus, the mechanical impedance of which is to be determined, is then attached to the moving coil which is again driven at the desired frequency and the receiver is again brought to silence by a second adjustment of the tension in the strip and the variable resistance in the fourth arm of the bridge. These values are then recorded and the difference between the two sets of readings is a measure of the mechanical reactance and the mechanical resistance of the piece of apparatus. From these readings the mechanical impedance is computed.

The invention may be more clearly understood by reference to the accompanying drawings in which:

Fig. 1 is a diagrammatic view of the electrical circuit embodying this invention;

Fig. 2 is a rear view showing the arrangement of parts of the mechanical measuring device.

Fig. 3 is a front view showing the coil supported in the magnetic field; and

Fig. 4 is a side sectional view of the mechanical portion of the hybrid bridge;

Referring to the drawings, it is seen that the device comprises a hybrid bridge partly electrical and partly mechanical, two arms of which $ab$ and $ad$ consists of equal simple fixed electrical resistances 10 and 12. The third arm $bc$ consists of the coil 16 which is arranged to be coupled to the device, the mechanical impedance of which is to be measured. The fourth arm $dc$ consists of a variable electrical resistance 13 calibrated to read directly in mechanical ohms, and a simulating coil comprising a fixed electrical resistance 14 and a fixed electrical inductance 15, and having an electrical impedance frequency characteristic the same as that of the moving coil 16 when the moving coil is held stationary. The coil 16 as shown in Figs. 3 and 4 is mounted in the center of a steady magnetic field by means of three tension members 19, 20 and 21 and is connected by means of lead wires 22 and 23, terminal block 44 and lead wires 45 and 46 to the electrical portion of the bridge at points *bc*. This method of supporting the coil insures a single degree of motion. The tension members 19, 20, and 21 supporting the coil are preferably of piano wire approximately .048″ in diameter, spaced 120° apart and silver soldered at the center to a disc of steel 24. A driving pin 25 is soldered to disc 24 perpendicularly to the plane of the three tension members 19, 20 and 21. The other ends of these members are fastened to the lever arms 26, 27 and 28 which rest on knife edge fulcrums 29, 30 and 31 respectively. The long ends of the lever arms are pulled inward by stranded wires 32, 33 and 34 which wind over the periphery of the drum 35, attached to shaft 36. An adjustable friction pin 41 on each lever arm provides for centering the moving coil in the magnetic field, produced by electromagnet 47 which is attached to base 43, of brass or other nonmagnetic material and which is magnetized by means of exciting coil 18 mounted upon the core 17. To the shaft 36 there is fastened a scale arm 37 and also a sheave member 38 to the periphery of which there is attached a cord 50. The scale arm contains a weight 39 which when moved back and forth along the arm tends to rotate drum 35 thereby producing a variation in the tension in the members 19, 20 and 21, a variation of one notch on the arm preferably giving changes in tension of about 1,000 grams. A graduated spring balance 40 is fastened to the cord 50 at one end and to a take-up screw 47 at the other end, and a variation in the tension of this spring balance also tends to rotate drum 35 thereby producing a variation in the tension of members 19, 20 and 21. The ratios of the lever arms and the diameters of the disc and drum are such that the stress in the tension members is less than their yielding strength.

In the operation of this device the moving coil 16 is driven at a desired frequency by means of an electrical oscillator 42 the current from the oscillator being led into the bridge at points *a* and *c* preferably through a filter 51. The current in the system may be measured by milliammeter 53 which is suitably connected in the circuit. The system is balanced by simultaneously varying the resistance 13 and the tension in members 19, 20 and 21. An approximate balance is first obtained by simultaneously varying the position of the weight 39 and the variable resistance 13 and the final balance obtained by simultaneously varying the tension in the graduated spring balance 40 and the variable resistance 13. The telephone receiver 52 connected across the bridge at points *b* and *d* indicates by silence when a balance has been reached. If the frequency from the oscillator is pure in quality and no extraneous vibrations are set up in the system being measured a balance with no tone in the head receivers should be obtained. If other than the fundamental frequency is present in the ear phones care should be taken to balance out the frequency at which measurements are being made. The measurement of the tension of the wires 19, 20 and 21 which may be computed from the position of the weight 39 on the lever arm and the reading on scale 40 and the reading of the variable resistance of the fourth arm of the bridge which is calibrated to read directly in mechanical ohms are then recorded. The measurement of the tension necessary in the members to bring the system to a balance is a measurement of the mechanical reactance of this system since at resonance the mass reaction of the system is equal to the stiffness reaction of the tension members. The measurement of the variable resistance is a measurement of the mechanical resistance of the system since in an electro-dynamical device of this type when at resonance the electrical motional impedance of the moving coil is a pure resistance and this motional electrical resistance is a measure of the mechanical resistance of the entire device, the relation between them being an inverse one.

A piece of apparatus, the mechanical impedance of which is to be determined, is then securely attached to the pin 25 by soldering, the employment of threaded portions, or other suitable means. In the arrangement disclosed in Fig. 4, the device is shown connected to a cone loud speaker 54, the pin 25 of the device being held thereto by means of the set-screw 56. After the device is securely fastened to the apparatus to be tested the coil is again driven in the magnetic field at the desired frequency and the system is again brought to balance by a second adjustment of the tension members and of the variable resistance in the fourth arm of the bridge. The amount of tension in the members 19, 20 and 21 and the value of the variable resistance 13 in the fourth arm of the bridge are again recorded. The difference between the two values of tension in members 19, 20 and 21 is a measure of the mechanical reactance of the piece of apparatus and the difference in the readings of the variable resistance 13 in the fourth arm of the bridge gives the mechanical resistance of the piece of apparatus. From these readings the mechanical impedance of the piece of apparatus may be computed in a well known manner.

What is claimed is:

1. In a device for measuring mechanical impedance, a bridge circuit comprising in one arm an impedance member having a variable tension member acting thereon and in a second arm a variable resistance, and means for varying said variable resistance and the tension in said member to balance said circuit at a predetermined frequency.

2. In a device for measuring mechanical impedance, a bridge circuit, one arm of which comprises an electrical coil supported in a steady magnetic field by a plurality of tension members, another arm of which comprises a variable resistance, means for driving said coil in said field, and means for varying said variable resistance and the tension in said members to balance said circuit at a predetermined frequency.

3. In a device for measuring mechanical impedance, a bridge circuit, one arm of which comprises an electrical coil supported in a steady magnetic field by a plurality of tension members, another arm of which comprises a variable resistance, means for driving said coil in said field, means for varying said tension members and said variable resistance to balance said circuit at a predetermined frequency and means for indicating the amount of tension in said members and the amount of said resistance.

4. In a device for measuring mechanical impedance, a bridge circuit, one arm of which comprises an electrical coil supported in a steady magnetic field by means of a plurality of tension members, another arm of which comprises a variable resistance and a simulating coil, means for driving said electrical coil in said field, and means for varying said variable resistance and the tension of said members to balance said circuit at a predetermined frequency.

5. In a device for measuring mechanical impedance, a bridge circuit, one arm of which comprises an electrical coil supported in a steady magnetic field by a plurality of tension members, another arm of which comprises a variable resistance and a simulating coil consisting of a fixed electrical inductance and a fixed electrical resistance so proportioned as to counter-balance the motionless impedance of said electrical coil, means for driving said electrical coil in said magnetic field, and means for varying said variable resistance and the tension in said members to balance said circuit at a predetermined frequency.

6. In a device for measuring the mechanical impedance of an object, a bridge circuit, one arm of which comprises an electrical coil supported in a steady magnetic field by means of a plurality of tension members, another arm of which comprises a variable resistance, means for driving said coil in said field, means for attaching the object to be measured to said coil and means for varying the tension of said members and the resistance of said variable resistance to balance said circuit before and after said object is attached.

7. In a device for measuring the mechanical impedance of an object, a bridge circuit, one arm of which comprises an electrical coil supported in a steady magnetic field by means of a plurality of tension members, another arm of which comprises a variable resistance calibrated to read directly in mechanical ohms, means for driving said coil in said field, means for attaching the object to be measured to said coil, means for varying the tension of said members and for varying said resistance to balance said circuit before and after said object is attached, and means comprising a calibrated spring scale and said variable resistance to indicate the amount of tension required in said members and the amount of resistance required in said variable resistance to balance said circuit before and after said object is attached.

8. The method of measuring the mechanical impedance of a piece of apparatus which comprises vibrating an electrical coil which forms one arm of an electrical bridge circuit in a steady magnetic field, balancing said circuit, attaching said object to said coil and again balancing said circuit.

9. The method of measuring the mechanical impedance of an object which comprises varying the resistance in one arm and the tension of an elastic member on which an electrical coil is supported in a magnetic field in another arm of a bridge circuit to balance said circuit, attaching said object to said coil, again balancing said circuit and determining the change in said resistance and tension of said member from the first balance of said circuit.

In witness whereof, I hereunto subscribe my name this 3rd day of February, 1928.

HENRY C. HARRISON.